Patented Dec. 5, 1950

2,532,691

UNITED STATES PATENT OFFICE 2,532,691

WATER-REPELLENT FIBROUS STRUCTURES AND PROCESS FOR OBTAINING SAME

Kenneth L. Berry, Hockessin, Del., assignor to E. I. du Pont de Nemours & Company, Wilmington, Del., a corporation of Delaware No Drawing. Application February 5, 1947, Serial No. 726,717

15 Claims. (Cl. 260—29.6)

This invention relates to a new water-repellent treatment for fibrous structures and to the products so obtained.

Textiles have been rendered water-repellent by application of waxy substances, such as hydrocarbons and long chain fatty acids or derivatives thereof, applied from solutions or dispersions. The major problems have been to choose the best materials, and to formulate and apply them so that the water-repellent finish is not removed by service and cleaning. In trying to solve these problems numerous treatments have been devised, but they generally have one or more of the following shortcomings: (1) the use of expensive or inflammable organic solvents is required, (2) the fibers are damaged by some of the chemicals or heat-treatments involved, (3) the treatment is applicable to only one or, at best, a few fiber substances, (4) the process of application is complex, or (5) the water-repellent effect is lost or seriously diminished by laundering or dry cleaning.

This invention has as an object a simple and effective process for treating fibrous structures to make them water-repellent. A further object is to provide water-repellent fibrous structures in which the fibers are essentially unchanged chemically, and in which the water-repellent effect is resistant to service, laundering, dry cleaning, and ironing. Other objects will appear hereinafter.

The above objects are accomplished by impregnating fibrous structures with an aqueous, colloidal dispersion of polytetrafluorethylene containing as a surface active agent a small amount of a water-soluble salt of a polymeric amic acid, and then baking the impregnated product until the amic acid salt has been converted into a water-insoluble form.

The water-soluble salts used in the practice of this invention are, as described more particularly hereinafter, an ammonium or basic amine salt of a polymeric amic acid. These dispersing agents are particularly valuable for the present purpose. These salts, by reason of their transitory nature, do not contribute water-sensitivity to the film obtained from the dispersion as do other dispersing agents.

It is also essential in accomplishing the objects of this invention that a colloidal dispersion of the polytetrafluoroethylene be used. These dispersions, as contrasted with suspensions of powdered polymer, are obtained by conducting the polymerization in aqueous systems which have low ionic strength and in which the material polymerized consists essentially of tetrafluoroethylene so that the homopolymer is obtained.

The polymeric amic acids, which are used in the form of their ammonium or amine salts, are obtained by amidation of a polymeric polycarboxylic acid anhydride with ammonia or a primary alkylamine such as ethyl, propyl, butyl and amylamines. Although the alkyl amines containing less than seven carbon atoms are preferred for this purpose, the longer chain alkyl amines up to 18 carbon atoms, for example, can be used.

The polymeric amic acids can be made either by suspending or dissolving the polymeric acid anhydride in a suitable organic solvent, adding ammonia or a primary alkylamine with stirring, and then treating the resulting suspension either with ammonia, dilute aqueous ammonium hydroxide or a water-soluble basic amine until the polymeric amic acid has been converted to the ammonium or basic amine salt. The ammonium salt of the polymeric amic acid can be isolated by filtration or other means known to the art. The polymeric polycarboxylic acid anhydride is an interpolymer of a polymerizable organic compound containing an ethylenic double bond as the sole carbon-to-carbon unsaturation with an acid anhydride having the formula:

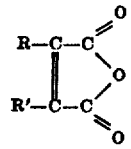

where R and R' are hydrogen, alkyl, aryl, aralkyl or cycloalkyl, for example, methyl, ethyl, propyl, octyl, decyl, phenyl, tolyl, xylyl, benzyl and cyclohexyl. Methods for obtaining these copolymers are described in U. S. Patents 2,047,398 and 2,378,629.

The mentioned ethylenically unsaturated organic compounds that are interpolymerized with the acid anhydride include ethylene, propylene, butylene, isobutylene, styrene, indene, vinyl acetate, methyl acrylate, and methyl methacrylate. In these polymeric acid anhydrides the two recurring non-oxo-carbonyl groups are attached directly to adjacent carbon atoms of the polymeric chain.

In preparing the polymeric amic acids it is preferred to react one mole of ammonia or a lower primary alkylamine with one mole of the polymeric acid anhydride, assuming that the equivalent molecular weight of the polymeric acid anhydride is that of the structural unit. The formation of the salt is effected, as has been noted previously, by treatment with ammonia, ammonium hydroxide or water-soluble basic amine. These basic amines used have an ionization constant value greater than $1 \times 10^{-6}$, when measured at 25° C., and are soluble to the extent of at least 5 parts per 100 parts of water at 25° C.

A water soluble salt of a polymeric amic acid of the above described type which is readily prepared is that used in the subsequent examples and consists of ammonium polystyrene/maleamate. This salt was obtained by the following procedure:

Finely divided styrene/maleic anhydride copolymer having a viscosity of about 6.2 centipoises at 25% solids in methyl ethyl ketone at 25° C., was suspended in about 10 times its weight of dry benzene and ammonia gas was passed into the suspension during several hours, at which time an excess of ammonia remained in the benzene. After standing for about 15 hours the product was removed by filtration and the residual benzene and excess ammonia allowed to evaporate. The residual ammonium salt of the polymeric styrene/maleamic acid was a finely divided, colorless solid, which dissolved readily in water. Such solutions at 10% solids and pH of 8.0 have a viscosity of about 20 centipoises at 25° C.

The invention is illustrated by the following examples in which the percentages are by weight. The water repellence rating mentioned is determined in the manner described in American Dyestuffs Reporter 30, 6-14 (1941).

Example I

Undyed, unsized cotton sateen is dipped three times in a 2.5 percent colloidal polytetrafluoroethylene dispersion containing 0.1 percent ammonium polystyrene/maleamate as the surface active agent. The cloth is baked for ten minutes at 230° F. after each dip. The cloth becomes successively more water repellent after each treatment. The cloth is finally ironed and subjected to the spray rating test. It has a water repellence rating of 90, initially, and 50 after three severe launderings.

Example II

White, 9 oz. cotton sateen is immersed in an aqueous dispersion containing 4 percent polytetrafluoroethylene and 0.1 percent ammonium polystyrene/maleamate as a transitory dispersing agent. The fabric is then passed through a wringer, dried and baked five minutes at 250° F. to convert the dispersing agent to its insoluble form. The fabric thereby is rendered remarkably water-repellent; furthermore, the water repellency remains after severe laundering and dry cleaning treatments.

Example III

White 9 oz. cotton sateen is immersed in an aqueous dispersion containing 5 percent polytetrafluoroethylene, 0.1 percent ammonium polystyrene/maleamate, and 1 percent of di-methylol p-cresol. The fabric is passed through a wringer, then dried and baked five minutes at 35° F. to convert the di-methylol compound to a resin. The resultant finish affords excellent water-repellence which is unchanged after three severe launderings and still serviceable for essentially the life of the fabric.

Example IV

A nylon fabric is treated as in Example III with a 5 percent polytetrafluoroethylene dispersion containing 0.1 percent ammonium polystyrene/maleamate and 1 percent hexamethylene-bis-(cycloethylene-urea). After curing by baking 5 minutes at 300° F. a desirable water-repellent finish is obtained.

Example V

White, 9 oz. cotton sateen is treated as in Example III with a 2.5 percent polytetrafluoroethylene dispersion containing 1.3 percent methylene-bis-(stearamide) and 0.3 percent ammonium polystyrene/maleamate. After curing 5 minutes at 350° F., the fabric possesses an excellent, durable water repellent finish.

Example VI

Cotton sateen is treated as in Example V, the dispersion containing as a fourth component 0.5 percent of di-methylol p-cresol. The finish, after curing 5 minutes at 350° F., is water repellent and durable for the life of the fabric.

Although it is not necessary, it is sometimes desirable to incorporate in the treating dispersions auxiliary materals such as pigments, resins, and other modifiers to obtain optimum results. Instead of dipping, these dispersions can be applied to the fibrous structures by spraying, painting and flowing.

The aqueous dispersion of polytetrafluoroethylene used in the examples was obtained by the following procedure:

A pressure vessel fitted with a gas inlet tube was filled approximately two-thirds full with a 0.1% aqueous solution of disuccinic acid peroxide. The vessel was then evacuated and heated to 65° C. Tetrafluoroethylene was led into the vessel at a pressure of 350 p. s. i. and the latter agitated continuously for about 3 hours. At the end of this time there was obtained a colloidal dispersion of polytetrafluoroethylene containing 4% of polytetrafluoroethylene.

The particles of polytetrafluoroethylene in the dispersion are of colloidal size and are frequently rod-shaped. The smaller dimension is of the order of 0.1 micron while the larger dimension ranges approximately from 0.1 to 0.8 micron. The dispersions, as prepared, are unstable in that the solid phase is readily coagulated by flotation agitation, by small concentrations of ions, or water-miscible organic liquids. It is for this reason that the dispersions are stabilized by addition of a water-soluble ammonium or amine salt of a polymeric amic acid, which because of its transitory nature does not contribute water-sensitivity to the dried film.

Since the polymeric amic acids are water-insoluble, it is necessary that the pH of the polytetrafluoroethylene dispersions be raised above a pH of 5 and preferably above a pH of 7 by addition of ammonia prior to addition of the water-soluble salt of the polymeric amic acid.

The best results are obtained with dispersions having a polytetrafluoroethylene concentration of from 3% to 8% by weight, although concentration of from 2% to 40% can be used. The preferred solids concentration is determined by how much polymer is desired in the fabric and how many impregnations can be employed to deposit this amount of polymer. For maximum economy it is desirable to employ only one impregnation and to deposit the minimum amount of polymer necessary to get the desired water-repellent effect.

Solids concentrations can be reduced by adding water to the dispersions. Dispersions may be concentrated when necessary by such known methods as evaporation, ultrafiltration, electrodecantation, or reversible flocculation.

Examples of other ammonium or amine salts of the polymeric amic acid that can be used in place of the salt mentioned in the examples are those of polymeric N-methyl styrene/maleamic acid, polymeric N-ethyl styrene/maleamic acid, polymeric N-propyl ethylene/maleamic acid, polymeric N-cyclohexyl propylene/maleamic acid, polymeric N-isopropyl styrene/maleamic acid, polymeric N-phenyl styrene/maleamic acid and the like. Such polymeric amic acids of different molecular weight and solution viscosity characteristics may be used. In general, however, products of low viscosity characteristics are preferred, for example, products having a viscosity of less than 200 centipoises at 10% solids in aqueous solution at 25° C. and at a pH of 7 to 8. Further details with regard to the preparation of these water-soluble amic acid salts are contained in application Serial No. 663,642, filed April 19, 1946, by M. E. Cupery now U. S. Patent No. 290,677. The polytetrafluoroethylene dispersions used in the practice of the present invention contain the amic acid salt in amounts of from 0.1 to 10%, and preferably from 2% to 5% of the weight of the polytetrafluoroethylene in the dispersion.

For application of the dispersions to fibrous structures, e. g., fabrics, simple dipping of the fabric in the dispersion is preferred. The fabric is then wrung to remove excess dispersion and allowed to dry. At this stage the treated fabric has excellent water-repellency and the treatment has surprising resistance to dry cleaning and laundering. An improvement in water-repellency and resistance to dry cleaning and laundering is obtained by baking the coating at temperatures above 212° F. for about 5 to 10 minutes; this baking treatment converts the polymeric amic acid salt dispersing agent to a water-insoluble form, the salt probably being converted to an imide by the heating. The baking temperature must be below the decomposition temperature of the fibrous material used. In the case of fibers of organic composition, such as cellulose, wood, nylon, viscose rayon, linen, vinyl resins, and cellulose esters, the preferred temperatures are in the range of from 225° F. to 350° F. These temperatures do not cause fusion of the polytetrafluoroethylene and it is surprising that a permanent water-repellent effect is developed without fusion of the polymer. When heat-resistant inorganic fibers, such as glass, asbestos and certain metals are used, baking temperatures of up to or above 621° F. (the transition point of the polytetrafluoroethylene), but below the temperature at which the fiber disintegrates can be employed. In this case the polytetrafluoroethylene is sintered and the permanency of the water-repellent effect conferred is essentially absolute.

As many apparently widely different embodiments of this invention may be made without departing from the spirit and scope thereof, it is to be understood that the invention is not limited to the specific embodiments thereof except as defined in the appended claims.

I claim:

1. A composition of matter which comprises a colloidal aqueous dispersion of polytetrafluoroethylene containing from 2% to 40% of polytetrafluoroethylene and from 0.1% to 10% by weight of the polytetrafluoroethylene of a salt of the class consisting of ammonium and water-soluble basic amine salts of an N-monoalkyl substituted polymeric amic acid of an interpolymer of a polymerizable organic compound containing an ethylenic double bond as the sole aliphatic carbon-to-carbon unsaturation with a butenedioic acid anhydride, the recurring two non-oxo carbonyl groups in said polymeric amic acid being attached directly to adjacent carbon atoms of the polymeric chain which contains structural units in which the amide nitrogen atom has attached thereto hydrogen and a long-chain monoalkyl substituent of at least seven carbon atoms, the basic amines of said salts being those having an ion'zation constant value greater than $1 \times 10^{-6}$ when measured at 25° C.

2. The composition defined in claim 1 in which said salt is the ammonium salt of said polymeric amic acid.

3. The composition set forth in claim 2 in which said polymeric amic acid is polymeric styrene/maleamic acid.

4. The composition defined in claim 1 in which said salt is a basic amine salt of said polymeric amic ac'd.

5. The composition set forth in claim 4 in which said polymeric amic acid is polymeric styrene/maleamic acid.

6. A process for obta'ning a water-repellent fibrous structure which comprises impregnating said structure with an aqueous colloidal dispersion containing from 2% to 40% by weight of the polytetrafluoroethylene and from 0.1% to 10% by weight of the polytetrafluoroethylene of a salt of the class consisting of ammonium and water-soluble bas'c amine salts of an N-monoalkyl substituted polymeric amic acid of an interpolymer of a polymerizable organic compound containing an ethylenic double bond as the sole aliphatic carbon-to-carbon unsaturation with a butenedioic ac'd anhydride, the recurring two non-oxo carbonyl groups in said polymeric amic acid being attached directly to adjacent carbon atoms of the polymeric chain which contains structural units in which the amide nitrogen atom has attached thereto hydrogen and a long-chain monoalkyl substituent of at least seven carbon atoms, the basic amines of said salts being those having an ionization constant value greater than $1 \times 10^{-6}$ when measured at 25° C., and bak'ng the impregnated fibrous structure at a temperature above 212° F. and below the decomposition temperature of the fibrous structure.

7. The process set forth in claim 6 in which said salt is the ammonium salt of polymeric styrene/maleamic acid.

8. The process set forth in claim 7 in which said polymeric amic acid is polymeric styrene/maleamic acid.

9. The process set forth in claim 6 in which sa'd salt is a basic amine salt of said polymeric amic acid.

10. The process set forth in claim 6 in which said polymeric amic acid is polymeric styrene/maleamic acid.

11. A fabric impregnated with polytetrafluoroethylene and with the heat conversion product of a salt of the class consisting of ammonium and water-soluble basic amine salts of an N-monoalkyl substituted polymeric amic acid of an interpolymer of a polymerizable organic compound conta'ning an ethylenic double bond as the sole aliphatic carbon-to-carbon unsaturation with a butenedioic acid anhydride, the recurring two non-oxo carbonyl groups in said polymeric amic acid being attached directly to adjacent carbon atoms of the polymeric chain which contains structural units in which the amide nitrogen atom has attached thereto hydrogen and a long-chain monoalkyl substituent of at least seven carbon atoms, the basic amines of said salts being those having an ionization constant value greater than $1 \times 10^{-4}$ when measured at 25° C. in amount of from 0.1% to 10% by weight of the polytetrafluoroethylene.

12. The impregnated fabric defined in claim 11 in which said heat conversion product is that of the ammonium salt of said polymeric amic acid.

13. The impregnated fabric defined in claim 12 in which said polymeric amic acid is polymeric styrene/maleamic acid.

14. The impregnated fabric defined in claim 11 in which said heat conversion product is that of a basic amine salt of said polymeric amic acid.

15. The impregnated fabric defined in claim 14 in which said polymeric amic acid is polymeric styrene/maleamic acid.

KENNETH L. BERRY.

REFERENCES CITED

The following references are of record in the file of this patent:

UNITED STATES PATENTS

| Number | Name | Date |
|---|---|---|
| 1,976,679 | Fikentscher | Oct. 9, 1934 |
| 2,440,190 | Alfthan | Apr. 20, 1948 |
| 2,451,370 | Alderson | Oct. 12, 1948 |
| 2,456,177 | Cupery | Dec. 14, 1948 |
| 2,496,989 | Cupery | Feb. 7, 1950 |